Aug. 11, 1964

E. SCHNITZER 3,144,219

MANNED SPACE STATION

Filed April 5, 1961

INVENTOR
EMANUEL SCHNITZER

BY

ATTORNEYS

Aug. 11, 1964     E. SCHNITZER     3,144,219
MANNED SPACE STATION Filed April 5, 1961     3 Sheets-Sheet 3

INVENTOR
EMANUEL SCHNITZER

BY

ATTORNEYS

United States Patent Office 3,144,219
Patented Aug. 11, 1964

3,144,219
MANNED SPACE STATION
Emanuel Schnitzer, Newport News, Va., assignor to the United States of America as represented by the Administrator of the National Aeronautics and Space Administration
Filed Apr. 5, 1961, Ser. No. 101,029
18 Claims. (Cl. 244—1)
(Granted under Title 35, U.S. Code (1952), sec. 266)

The invention described herein may be manufactured and used by or for the Government of the United States of America for governmental purposes without the payment of any royalties thereon or therefore.

This invention relates generally to a planetary orbital space station or space laboratory, and more particularly to a manned space station capable of being completely foldably or collapsibly stored in the payload stage of a multi-stage launch vehicle, launched into a planetary orbit, and then self-erected into its operating configuration upon actuation of simple built-in mechanical systems.

It is contemplated that, within the relatively near future, manned space satellites or space stations will be established in orbit around the earth at altitudes which may be measured in hundreds of miles. Although this field of endeavor constitutes a relatively young art, much critical thought has been devoted over the past few years to the feasibility of placing such a space station or space laboratory in a high planetary orbit, in view of the tremendous scientific and technological advantages derivable therefrom. Briefly, such a space station, if provided with the capability of being manned by human observers and experimenters over extended periods of time, may be utilized for the purposes of terrestrial and astronomical observation, as well as military surveillance, to mention a few particularly significant initial benefits. Concurrently therewith, other programs involving probable utilization of such orbital space stations, in addition to those hereinbefore set forth, may include the psychological and physiological study of human reactions to a spatial environment over lengthy periods of time, as well as the study of materials, structures, mechanical components and systems, and communications systems in a low or zero gravity spatial vacuum. Further, from the long range viewpoint, it is considered that it will be necessary to utilize such manned orbital space stations as launch bases for despatching space vehicles carrying human explorers to the moon and the other planets of the solar system, barring some presently unforeseen but much to be desired technological breakthrough of giant proportions in the field of propellants for such space vehicles.

Returning now to the problem of placing such space stations in orbit, it seems obvious that the preponderance of present thought and current effort in this field is being directed toward the provision of large, rigid, heavy metallic space station structures constituted by a number of interdependent sections, each of which is capable of being established in orbit as the payload of an individual launch vehicle system. It is contemplated that, once each of such space station sections has been placed in orbit in as close proximity as may be possible, they will be brought together by persons operating small spacecraft or working in space suits, and then interconnected in a prearranged relationship to form the completed space station. The difficulties and complexities inherent in constructing such a space station in orbit, however, will be immediately apparent to those skilled in the field of aerospace technology. For one thing, a number of very expensive and complex launch vehicles would be required, which, if each carries only a relatively low density space station section, may not be loaded to their full boost capabilities. The problem of obtaining reasonably accurate orbital rendezvous of the individual space station sections would also be difficult of solution; requiring relatively complex launch vehicle guidance systems highly susceptible to malfunction and failure, coupled with close tolerance computer planning, launch operations, and trajectory and stage separation control. Further, the collection and interconnection of such space station sections would very likely result in deleterious physiological and psychological effects upon human beings who would be required to venture out into a spatial vacuum for protracted periods of time in space suits or other lightly shielded life support devices. The disadvantages of rigid, sectionalized space station orbital construction, as hereinbefore set forth, are largely eliminated, however, in the space station configuration forming the subject matter of the present invention, which is not only capable of orbital operation as a manned satellite limited in duration only by the capabilities of its life support system, but is also capable of being established in orbit as a unitary structure boosted aloft in a collapsed or folded condition by a single launch vehicle system and then self-erected in orbit through the actuation of simple built-in mechanical systems.

Accordingly, it is an object of the present invention to provide a manned satellite space station structural configuration capable of being established in orbit in a high density, low volume packaged condition.

Another object of the instant invention is the provision of a manned satellite space station structural configuration having the capability of being established in a planetary orbit in a high density, low volume packaged condition and further capable of self-erection to its operating configuration.

A still further object of the present invention is the provision of a manned satellite space station structural configuration erectable in orbit through the operation of built-in mechanical systems to its operating configuration from a packaged launch condition.

Still a further object of the instant invention is to provide a manned satellite space station configuration capable of being completely stored in a low volume, high density condition in the payload stage of a launch vehicle system yet erectable in orbit to an operating configuration encompassing a total volume of space many multiples of the volume of the launch vehicle system payload stage.

Still another object of the present invention is the provision of a manned satellite space station configuration characterized by the provision of human occupancy areas expandable from a folded launch-into-orbit condition to a final operating configuration in which artificial gravity may be established while the space station in its entirety is in a condition of gravitational and centrifugal equilibrium.

Yet another object of the present invention is the provision of a manner satellite space station configuration characterized by the provision of a human occupancy area expandable from a folded launch-into-orbit condition to a final operating configuration and which is divisible into separate areas each capable of sustaining life independently in the event of air leakage from one or more of the other of such separate areas.

Yet a still further object of the instant invention is the provision, in a manned satellite space station, of a human occupancy area divisible into separate areas each capable of sustaining human life independently in the event of the uninhabitability of one or more of the other of such separate areas due to air leakage while means operably coupled with such uninhabitable areas automatically effectuate stoppage of air leak openings.

Another still further object of the present invention is to provide, in a manned satellite space station, a flexible human occupancy area inflatable from a folded launch-into-orbit condition to a final expanded operating configuration and which is provided with integral independently inflatable furnishings for crew use.

Still another further object of the present invention is the provision, in a manned satellite space station, of a solar energy collector means expandable from a folded launch-into-orbit condition to a final extended operating configuration.

According to the present invention, the foregoing and other objects are obtained by providing, in a manned satellite space station, a centrally disposed life support center which may be carried by a rocket launch vehicle system payload stage and which is provided with a plurality of inflatable flexible tubular passageway elements extending radially outwardly therefrom and which are interconnected at their outer extremities with an inflatable ring or torus shaped crew occupancy or living quarters element containing integral individually inflatable crew use furnishings; these elements when deflated being foldable against the space station life support center for confinement therewith into a space small enough to be encompassed by the rocket launch vehicle payload stage. Solar energy collector means are also interconnected with the space station life support center, and are so constructed that they may be folded into a space small enough to be encompassed by the rocket launch vehicle payload stage hereinbefore mentioned, along with the space station living quarters, but are yet extensible to expose a surface thereof large in area to sunlight. The satellite space station also includes means for the mounting of instrument packages and the like, the docking of supply and crew relief space vehicles, and the segmentation of the torus crew quarters into independently habitable sections so that puncture of one section thereof would not necessarily endanger the lives of the persons aboard the space station. Further, provision is made in the space station for simple mechanical means for inflating the torus crew quarters and the passageways leading therefrom to the life support center and for erecting the solar collector means either automatically or by command signal, as desired; for effecting automatically the repair of punctures causing air leaks in the sectionalized crew quarters; and also for establishing artificial gravity in the torus shaped crew quarters.

A more complete appreciation of the invention and many of the attendant advantages thereof will be readily apparent as the same becomes better understood by reference to the following detailed description when considered in connection with the accompanying drawings wherein.

Figure 1:
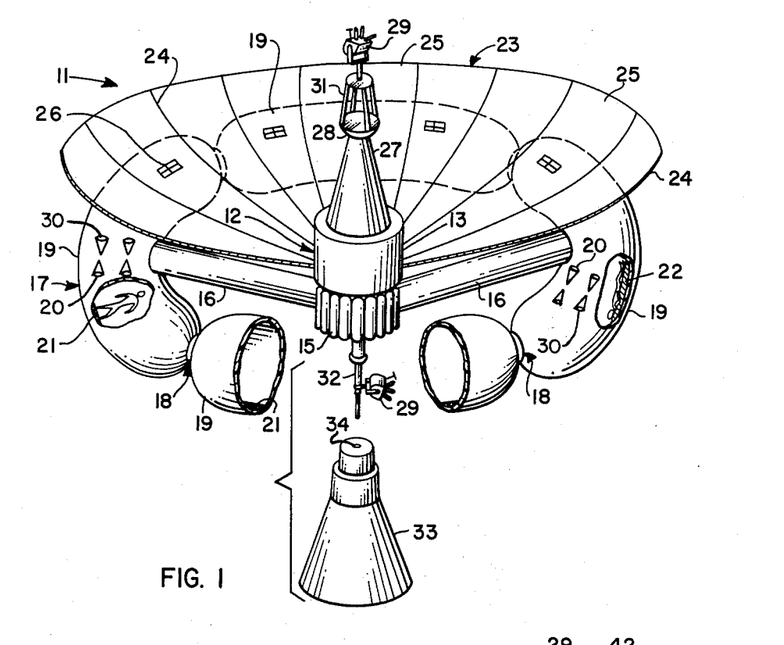
FIGURE 1 is a fragmentary perspective view, partially in section, of the manned space station in its orbital operating configuration.

Referring now more particularly to the drawings, wherein like reference numerals designate identical parts throughout the several views, and more particularly to FIGURE 1, there is shown a manned satellite space station, generally designated by the reference numeral 11. Space station 11 is provided with a centrally disposed life support center, generally designated by the reference numeral 12, which is generally cylindrical in form; having a cylindrical upper section 13 and a cylindrical lower section 14, not visible in FIGURE 1, which is smaller in diameter than upper section 13 and which is coaxially disposed below upper section 13 to form an extension thereof. A plurality of stores capsules or containers 15 of substantially cylindrical form are disposed around the greater portion of the cylindrical surface of life support center lower section 14 in substantially abutting relationship, with their longitudinal axes disposed parallel to the longitudinal axis of life support center lower section 14; the diameter of each capsule 15 being substantially equal to the difference in the radii of life support center sections 13 and 14, and the length of the capsules 15 being substantially the same as the length of life support center section 14. Stores capsules 15 are particularly adapted for storing liquids and gases; for example, water and compressed air, and when used for such a purpose are preferably detachably physically connected to the life support center section 14 and also detachably interconnected with flow conduits extending into life support center 12. It will be readily apparent that such an arrangement for storing supplies of liquids and gases will greatly facilitate the removal of exhausted stores capsules 15 and the replacement thereof with charged containers brought up to the space station by supply vehicles, although it is also considered within the scope of the present invention to store such supplies within the space station 11 rather than externally thereof, if desired. The stores capsules 15 also may be utilized for storing other expendable supplies if such is found necessary due to space limitations with space station 11.

The cylindrical surface of the life support center lower section 14 is not utilized for the attachment of stores capsules 15 along two diametrically opposed regions thereof. From each of these regions of the surface of life support center lower section 14 there extends radially outwardly a flexible tubular passageway element 16 sufficiently large in diameter to allow passage therethrough by a human being. The end of each passageway 16 is connected in sealed relation to the cylindrical wall of life support center lower section 14 around an opening formed therein defining a portal through which a human may pass from the interior of life support center lower section 14 into the passageway 16. Space station 11 also includes flexible tubular crew quarters, generally designated by the reference numeral 17, which generally conform to a torus or ring configuration. Crew quarters 17 are operationally disposed in concentricity with the space station life support center 12, with the plane dividing the torus into upper and lower halves being perpendicularly disposed relative to the longitudinal axis of life support center 12. The outer end of each of the passageways 16 is connectably sealed to crew quarters 17 in diametrically opposed regions of the inner periphery thereof; the outer end of each passageway 16 surrounding a portal in the wall of crew quarters 17 through which a human may pass from passageway 16 into crew quarters 17. Bulkheads, generally designated by the reference numeral 18, are provided at spaced intervals around the length of crew quarters 17 and divide or segment crew quarters 17 into a plurality of compartments or cells 19, as will more fully be set forth hereinafter. Reactive thrust generating means 20 (FIG. 1) such as small reaction motors, are connected to space station 11 around the outer periphery of the torus shaped crew quarters 17 and are so disposed as to generate thrust, upon activation, in a direction to start space station 11 when in its orbital operating configuration rotating about the longitudinal axis of life support center 12, which, as will hereinafter become obvious, is also the axis of symmetry of space station 11. When the desired rate of rotation of space station 11 about its axis of symmetry is obtained, the thrust generating means 20 are deactivated, and the space station 11 will continue to rotate at the desired rate. Further, similar thrust generating devices 30 are mounted on the periphery of crew quarters 17 so disposed as to generate reactive thrust, upon activation, in a direction to stop such rotation of space station 11 in the event zero gravity conditions are desired, as for scientific experimental reasons. The rotation of space station 11 establishes centrifugal forces which simulate gravitational forces within crew quarters 17, enabling crew members of space station 11 to think of the outer periphery of the torus as a "floor" toward which they are attracted by "gravity." Since crew quarters 17 are substantially circular in cross-section, in accordance with the geometrical definition of a torus, the crew compartments 19 are each provided with a flat floor 21 along the interior outer periphery thereof, constituted by a flexible sheet of strong, durable material stretched across an outer arc of the circular cross-section of the compartment 19 and forming therewith in cross-section a chord to such outer arc; the opposed long edges of the flexible sheet material forming a floor 21 being attached along spaced lines to the interior wall of compartment 19. Floor 21, however, is preferably made pervious to air, and the entire volume of air contained in a compartment 19 is free to circulate in the spaces both overlying and underlying the floor 21. Each compartment 19, therefore, may be inflated from a single source of incoming air, and as the compartment 19 is inflated floor 21 is stretched tight to provide a flat walking surface. Further, means are provided in each compartment 19 for automatically sealing punctures therein, as will more fully be set forth hereinafter, and as these means depend upon air currents set up by leakage of air through the puncture for successful performance, the entire inner wall of a compartment 19 is thereby operatively coupled with these means. Alternatively, however, floors 21 may also be made airtight and sealed to the inner wall of the compartments 19, and the space between the "chord" floors 21 and the "arc" walls of the crew compartments 19 is necessarily made independently inflatable; this space then preferably being filled with flexible cellular "honeycomb" material, with perforations in the wall of each cell thereof providing fluid communication means with each adjoining cell. The floor 21, thus formed, will be substantially rigid and will provide good footing for persons walking thereupon.

Crew quarters 17 are also preferably provided with inflatable built-in furnishings such as couches 22, which are integrally connected to the floor 21 or the inner wall of a compartment 19. The exterior of a couch 22 or the like is formed of air impervious flexible material contoured to define the operable configuration thereof, and each furnishing such as a couch 22 is preferably separately inflatable, with the interior thereof preferably containing a flexible honeycomb material similar to that which underlies a wholly airtight floor 21 in the second of the two floor constructions hereinbefore set forth. Of course, if the second of the two types of floor construction mentioned is utilized; that is, the construction in which the airtight floor 21 completely blocks air transfer between the spaces thereabove and thereunder, then the interior of a furnishing such as couch 22 is preferably made fluidly communicable with the airspace underlying the floor 21, eliminating the necessity of providing for separate inflation thereof. Additionally, noninflatable furnishings, not shown, such as tables and benches may be provided simply by connecting flexible sheets of strong, durable material between two locations on the inner wall of a compartment 19 at points equidistant above the level of the floor 21 thereof which, upon inflation of compartment 19, are stretched into substantially rigid usable surfaces.

Space station 11 also includes solar energy collector means, generally designated by the reference numeral 23, which in its erected operating configuration, as shown partially in section in FIGURE 1 with a sizable portion thereof removed in the interest of clarity, takes the approximate shape of a paraboloid. The solar collector 23 is connected to the outer cylindrical wall of the upper section 13 of life support center 12 in concentricity with the longitudinal axis thereof, which is always kept alined toward the Sun through the operation of any suitable conventional means. Solar collector 23 includes a plurality of light, resilient metal rods or rib members 24 normally straight in an unstressed condition which project in spokewise fashion from section 13 of life support center 12 through openings provided therein, not shown in the interest of clarity, and in which they are suitably pivotally mounted for movement in individual single planes in each of which, when extended, the longitudinal axis of life support center 12 will completely lie. The portion of each rib 24 lying within life support center upper section 13 is movable in lever fashion to rotate the rib about its fulcrum-like pivotal connection in an opening in life support center section 13 between a position in which the rib extends therefrom substantially perpendicular to the cylindrical wall of life support center section 13, not taking into account rib bending outwardly thereof, and a position in which the rib extends from the opening substantially parallel to the cylindrical wall of life support center section 13 in a direction away from the lower section 14 of the life support center which is operatively coupled with the crew quarters 17. This essentially umbrella-type arrangement is moved from the folded launch configuration to the operable extended position by movement of ribs 24 in lever fashion about their individual fulcrum-like pivotal connections, as discussed hereinbefore, by any conventional means such for example an air-driven piston, a coil spring or any other conventional mechanism acting on the ends of ribs 24 within life support center upper section 13. Stretched between adjacent ribs 24 are flexible gore panels 25 which are somewhat fan-shaped in form, but which, in the direction extending outwardly from life support center upper section 13, are progressively narrower than the corresponding distance which would be measurable between adjacent ribs 24 if these ribs were perpendicular through their entire lengths to the cylindrical wall of upper section 13. Further, each rib 24 is preferably so progressively contoured in cross section along its length that uniform or constant bending loads imposed thereon would bend the rib 24 into a parabolic curve. Thus, it will be seen that the gore panels 25, when interconnected between all adjacent ribs 24, will tend to be uniformly stressed, thereby bending ribs 24 into a parabolic curve, with the solar collector 23 assuming the shape of a paraboloid, when the ribs are extended to their maximum position of perpendicularity with the cylindrical wall of life support center upper section 13. Each of the gore panels 25 is preferably formed of a very thin film of a plastic such as Mylar upon which is vapor-deposited or otherwise coated a thin layer of a highly reflective metal such as aluminum, similar to the material disclosed in U.S. Patent No. 2,765,251, granted to L. E. Williams on October 2, 1956. Sunlight reflected from the surface of the solar collector 23 may be directed toward an area regarded as the focus thereof with efficiencies of at least as high as 50 percent.

Further, as the solar collector 23 is generally of a size sufficiently large to overlie crew quarters 17 and prevent direct exposure thereof to sunlight, a plurality of "windows" 26 are provided in selected gore panels 25, which may be merely clear sections of Mylar base film upon which the reflective metal layer has been eliminated, and which permit exposure of the underlying sections of the outer surface of crew quarters 17 to sunlight, as will be more fully explained hereinafter.

Projecting upwardly from the upper surface of life support center upper section 13 and collinearly therewith is a hollow pylon section 27 which may be of any desired tubular configuration but which is shown as being frustro-conical in form having an upper extremity terminating at the region of the focus of solar collector 23. Mounted on the pylon 27 at the focus of solar collector 23 is a spherical or spheroidal body 28 which serves as the boiler element of a powerplant positioned within pylon 27 and life support center upper section 13, not shown. This powerplant is preferably of the conventional fluid cycle type, however, which incorporates a turbo generator, and solar radiation reflected upon boiler 28 may evaporate a fluid such as mercury contained therein to drive the turbo generator. Heat storage means which may be of any conventional type may also be incorporated into the solar powerplant system to keep it in operation when space station 11 is in the earth's shadow, and which may be of conventional construction.

Space station 11 also includes an instrument package 29 gimballed for movement about two axes, one of which is the axis of symmetry of space station 11, and which is mounted above the boiler 28 on struts 31 connected therebetween. Instrument package 29 is preferably earth oriented to give the occupants of space station 11 a steady view of the earth through means of television cameras contained therein, and for this purpose is provided with a conventional infrared horizon scanner lock system. Instrument package 29 is also preferably provided with such other devices as communications antennas and the like.

Projecting downwardly from the lower surface of life support lower section 14 and collinearly therewith is a boom member 32. Affixed to boom 32 is a second instrument package 29 which is usable alternatively with the first of the hereinbefore mentioned instrument packages 29 to afford occupants of space station 11 a continuous view of the Earth as the space station progresses along its orbital path therearound. The lower end of the boom member 32 is utilizable as a mooring mast for a crew relief and station resupply space vehicle 33, which as illustrated may basically be of the type disclosed in the copending applications of M. A. Faget and others, Ser. No. 847,023, filed October 16, 1959, now Patent No. 3,093,346, and of M. A. Faget and others, Ser. No. 847,027, filed October 16, 1959, now Patent No. 3,001,739. As illustrated, space vehicle 33 is provided with an aperture 34 communicable with a hollow sleeve or the like contained therewithin into which the end of boom member 32 may be telescopically received and secured, thus securely mooring space vehicle 33 to space station 11. The lower surface of life support center lower section 14 also is provided with conventional airlock means, not shown, through which individuals wearing space suits may gain entry into space station 11.

The upper section 13 and the lower section 14 of life support center 12 are preferably divided by an airtight bulkhead provided with sealable access hatch means, not shown, interposed therebetween, inasmuch as the powerplant contained within upper section 13 and pylon 27 is preferably capable of unattended operation, and due to the possibility that the openings through which ribs 24 project from upper section 13 may develop air leaks, although the provision of such a bulkhead is by no means absolutely necessary for the successful practice of the invention. Further, the upper surface of torus shaped crew quarters 17, that is, the surface adjacent the lower surface of solar collector 23, is preferably painted black in the regions upon which sunlight passing through the windows 26 in solar collector 23 may fall; while the remainder of the crew quarters 17 is exteriorly coated with a suitable low emissivity material to cut thermal radiation losses to space, since this surface area of the crew quarters 17 is always in the shadow of the solar collector 23. It has been determined that, if the black area of the surface of crew quarters 17 upon which sunlight falls is properly proportioned with respect to the total surface thereof, solar energy alone may maintain an average temperature of about 70° F. within crew quarters 17, with only a small variation in inside temperature as space station 11 moves in and out of the earth's shadow.

The flexible material hereinbefore mentioned out of which the tubular passageways 16 and the tubular torus crew quarters 17 is made is somewhat like the material used in automobile tire construction in that it is essentially a laminated material composed of tough cord plies and a flexible binder. New laminated materials now available consisting of three plies of Dacron cords embedded in Butyl rubber, with the cords in each ply rotated approximately 45° relative to the cords of the next adjacent ply, are about five times as strong as automobile tire walls of similar thickness. Such materials, furthermore, are extremely flexible and have demonstrated very little deterioration when subjected to a hard vacuum and ultraviolet radiation over long periods of time, and are thus considered very well adapted for space station construction. By way of example, a 30-foot diameter torus made of such material and having a wall thickness of about $\frac{1}{10}$ inch, in which an internal pressure of about $\frac{1}{2}$ atmosphere is maintained, would have a safety factor of about five in skin or wall stress.

Figure 2A:
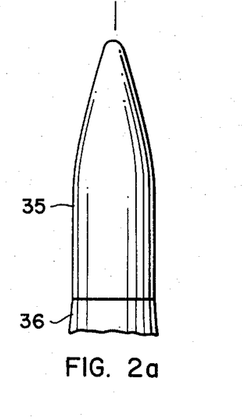
FIGURES 2(a)–2(e) illustrate the sequence of events in launch, jettison of launch vehicle nose cone, commencement of orbital erection, continuation of orbital erection, and completion of orbital erection of the manned space station of FIGURE 1.
Figure 2B:
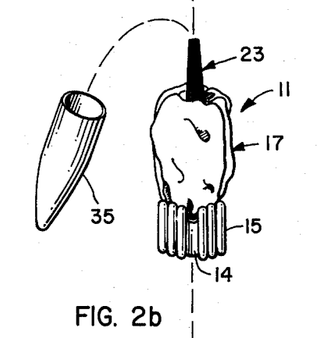
Figure 2C:
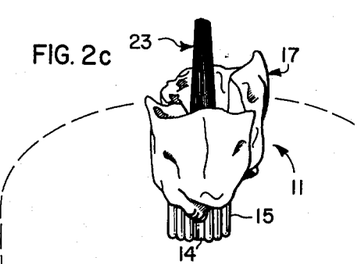
Figure 2D:
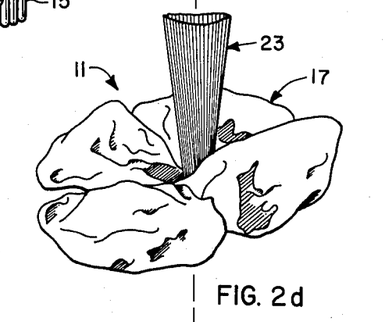
Figure 2E:
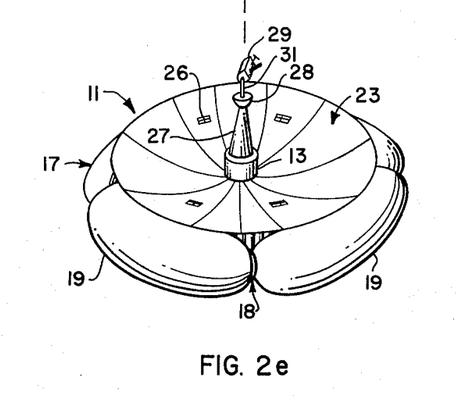

The sequence of events followed in establishing a space station 11 in orbit and there erecting the space station to its operating configuration is illustrated in FIGURES 2(a)-2(e). Initially, the foldable solar collector 23 is folded into its closed umbrella-like configuration with ribs 24 directed substantially upwardly and the gore panels 25 folded therebetween, and the flexible passageways 16 and crew quarters 17 are evacuated of air and folded around the life support center 12 and the folded solar collector 23, forming a long package small in diameter. Space station 11 in this folded condition is then stored in a hollow substantially conical payload stage container or nose cone 35, having an open base end, of a launch vehicle system, which is then mounted on a rocket launch vehicle 36, as shown in FIGURE 2(a). Rocket 36 is then fired to boost the payload stage thereof into a predetermined earth orbit, where the payload stage is separated from launch vehicle 36. Nose cone 35 is then forcibly ejected from around folded space station 11, as shown in FIGURE 2(b), by suitable conventional means such as spring devices, small reaction motors, or the like, and space station 11 is then free for commencement of erection procedures. A supply of compressed air carried in space station 11, whether in capsules 15 or elsewhere, is then released through conventional valve means, which may be actuated by means of timing devices at a predetermined interval after ejection of nose cone 35 or by means of telemetered command signals, into the interior of life support center lower section 14 from which it flows into passageways 16 and crew quarters 17 and commences to inflate these flexible areas into their orbital operating configuration, as illustrated in FIGURE 2(c). As air continues entering these areas, the space station begins to assume its orbital operating configuration, as shown in FIGURE 2(d). When air pressure within the human occupancy and passageway areas has reached a predetermined value, for example, about $\frac{1}{2}$ atmosphere, the inflation air supply is automatically shut off by conventional means, and the inflated areas have assumed their orbital operating configuration. Suitable conventional mechanical means, as discussed hereinbefore, are provided in life support center upper section 13 for applying leverage forces to the ends of ribs 24 positioned therein, and these means are actuated either automatically or by command signal for rotating ribs 24 about their pivoted connections in the openings in life support center upper section 13 to extend solar collector 23 to its operating configuration as shown in FIGURES 2(d) and 2(e).

It is not contemplated that space station 11 will carry crew members during launch and orbital erection. When space station 11 has been erected in orbit, the proper functioning of the essential systems thereof will be determined by the reception on the earth of telemeter signals transmitted from the space station, and the crew thereof will then be sent aloft in a space vehicle 33 to effect rendezvous with space station 11. Once the space vehicle 33 has been moored to boom member 32 of space station 11, the crew members may then readily gain entrance into the space station through the airlock means provided in life support center lower section 14.

Space station 11, as hereinbefore described, is not capable of carrying with it into orbit its crew members, who must be sent up into orbit in a separate space vehicle 33 to effect orbital rendezvous with the space station 11. Since, however, it would be desirable to eliminate the necessity of separately launching two such vehicles into orbit, an alternative and preferred embodiment of the space station of the present invention, generally designated by the reference numeral 37, is shown in partially sectioned side elevation in FIGURE 3 in a fully erected orbital operating configuration. Space station 37 is provided with a substantially cylindrical life support center, generally designated by the reference numeral 38, which includes an upper section 39 of inverted frusto-conical form, and a lower section 41 of substantially cylindrical form extending downwardly therefrom collinearly therewith; the length of cylindrical section 41 being on the order of about ⅘ of the total length of life support center 38. Extending radially outwardly in opposite directions from the cylindrical wall of cylindrical section 41 are flexible tubular passageway elements 16; each having an inner end connected and sealed to the outer surface of the cylindrical wall of cylindrical section 41 around an opening provided therein defining a portal through which a human occupant of space station 37 may pass from life support center 38 into the passageway 16. Disposed concentrically around life support center cylindrical section 41 is a flexible, tubular torus or ring shaped crew quarters element, generally designated by the reference numeral 17, and the outer end of each passageway element 16 is connected thereto in sealed relation, at diametrically opposed regions, around an opening formed therein defining a portal through which a human occupant of space station 37 may pass from passageway 16 into crew quarters 17. It will be noted that the passageways 16 and crew quarters 17 of space station 37, as described, are identical to the passageways 16 and crew quarters 17 of space station 11. Further, the crew quarters 17 of space station 37 are similarly identical in every respect to the crew quarters 17 of space station 11 insofar as the selection of materials and provision of bulkheads, floors, inflatable and stretchable furnishings, and the like, is concerned.

Figure 3:
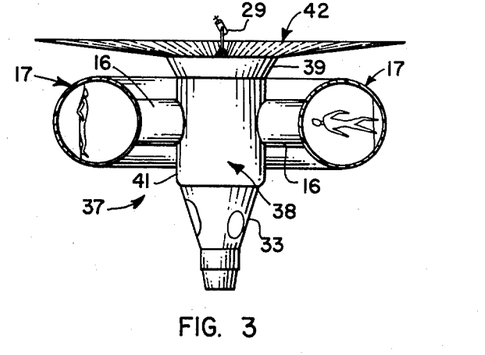
FIGURE 3 is a side elevational view, partially in section, of an alternative embodiment of the manned space station of the present invention in its orbital operating configuration.

It will be noted also, that life support center cylindrical section 41 of space station 37, in contradistinction to the life support center lower section 14 of space station 11, is not provided with externally carried stores capsules or containers, in order that the passageways 16 and crew quarters 17 of space station 37, when evacuated of air, may be folded therearound with the resulting total diameter of the package constituted by the cylindrical section 41, passageways 16, and crew quarters 17 being less than the maximum diameter of the frusto-conical section 39 of life support center 38. Internal provision is therefore made in space station 37 for the storage of the supplies normally carried by space station 11 in the stores capsules 15 attached thereto.

Figure 4:
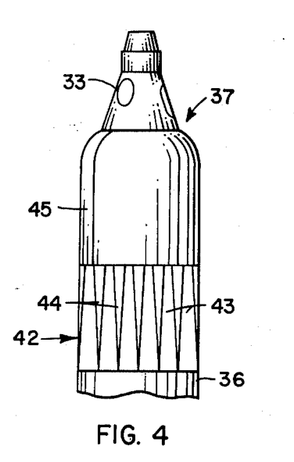
FIGURE 4 is a side elevational view of the manned space station of FIGURE 3 mounted on a launch vehicle in its launching configuration.

A solar energy collector, generally designated by the reference numeral 42, and which when operationally extended as shown in FIGURE 3 is substantially of disk form, is connected around the upper, greater diameter, peripheral base edge of frusto-conical section 39 of life support center 38. Solar disk 42 includes a plurality of radially outwardly extending rigid fan-shaped somewhat semiconical sections hingedly connected at their base ends around the periphery of frusto-conical section 39. As will more clearly be seen in FIGURE 4, alternate fan-shaped solar disk sections, designated by the reference numeral 43, may be considered as "outer" sections, and the remaining alternate fan-shaped solar disk sections, designated by the reference numeral 44, may be considered as "inner" sections. The hinge connection line of each of the outer disk sections 43 is spaced a somewhat greater radial distance from the longitudinal axis of life support center 38 than the hinge line of each of the inner disk sections 44, and the hinge connection line of each of the outer disk sections 43 is also spaced a corresponding distance below the level of the hinge line of each of the inner disk sections 44. It will now be apparent that the disk sections 43 and 44 may be pivoted upwardly from the erected disk configuration shown in FIGURE 3, in which each radial edge of each disk section 43 is angularly positioned from a radial edge of each adjoining disk section 44, to a position in which the disk sections 43 and 44 are substantially longitudinally parallel to the longitudinal axis of life support center 38, with disk sections 43 overlying disk sections 44, as best seen in FIGURE 4. Obviously, more than two layers of disk sections such as 43 and 44 will be required to form a solar disk 42 capable of assuming the alternate configuration shown in FIGURES 3 and 4, and therefore as many more concentric layers of such disk sections, having progressively corresponding radial and vertical displacement of their hinge lines as set forth hereinbefore, may be provided as found necessary. Any conventional actuation means, such for example those discussed hereinbefore for the movement of ribs 24, may be provided for pivoting disk sections 43 and 44 into the operable position shown in FIG. 3.

As much of the surface of each of the fan-shaped disk sections of solar disk 42 as may be exposed to sunlight when solar disk 42 is in its operating configuration, as shown in FIGURE 3, is substantially covered by conventional solar cells mounted thereon, not shown, capable of converting the radiant energy of sunlight directly into electrical energy. Of course, however, apertures preferably may be provided in the solar disk sections equivalent to the windows 26 of solar collector 23, for the purpose of providing solar heating for the crew quarters 17 of space station 37. The conventional solar cells mounted on solar disk 42 are operatively coupled with conventional electrical energy storage means, not shown, disposed within the life support center frusto-conical section 39, from which electrical power may be drawn as required for operation of space station 37 whether or not the space station is passing through the earth's shadow.

Centrally mounted on the upper base end of life support center 38 of space station 37 is an instrument package 29 similar to those provided in space station 11, and which is likewise gimballed for rotation about two axes; one of which is the axis of symmetry of space station 37 and likewise the longitudinal axis of life support center 38. A substantially frusto-conical or bell-shaped space vehicle 33 is detachably collinearly connected to the lower surface of life support center cylindrical section 41 and depends downwardly therefrom in an inverted position, with its broad circular end in contact with the circular lower surface of cylindrical section 41. Alined access hatch means, not shown, are provided in the circular contacting surfaces of cylindrical section 41 and space vehicle 33, and sealing means between these two contacting surfaces are positioned around the alined hatches, whereby crew members of space station 37 may pass directly back and forth between the interiors of space vehicle 33 and space station 37.

Space station 37 is shown in its packaged launching configuration mounted in an inverted position as the payload stage of a launch vehicle 36 in FIGURE 4 of the drawings. The space vehicle 33 discussed in the preceding paragraph is detachably connected to the space station 37, as set forth hereinbefore, and is thereby disposed above space station 37 in an upright position. Space vehicle 33 is constructed, basically, in accordance with the teachings of the two hereinbefore mentioned copending applications, Ser. No. 847,023 and Ser. No. 847,027, although it is designed to carry a number of persons. More significantly, although omitted from the drawings in the interest of clarity, space vehicle 33 in the launch position is provided with the emergency escape system particularly set forth in copending application Ser. No. 847,027, so that in the event of malfunction of launch vehicle 36 during the launching operation, space vehicle 33 may be separated from the space station 37 and safely return the human occupants thereof to the ground.

Crew quarters 17 and passageway elements 16 of space station 37, in the launch condition, have been evacuated of air and folded around cylindrical section 41 of life support center 38, as hereinbefore described. With space station 37 mounted on launch vehicle 36, a shroud element 45 of substantially cylindrical form and which is divisible into two substantially hemicylindrical parts at diametrically opposed parting lines is connected therearound to completely shield the inflatable sections of the space station 37 during launch. The solar disk 42 of space station 37 is not encompassed within the confines of shroud 45 for launch, however; the rigid fan-shaped sections thereof being disposed in the hereinbefore mentioned overlapped relationship and extending downwardly over the outer skin of the upper portion of launch vehicle 36, as shown in FIGURE 4, and enclosing the upper portion of launch vehicle 36 within the thus folded solar disk 42. The enclosed upper end of launch vehicle 36 may be provided with a concavity for enclosing in the launch condition the gimballed instrument package 29 mounted on the adjacent surface of space station 37.

Space station 37 is launched into orbit by launch vehicle 36 in the same manner as hereinbefore set forth in the case of space station 11. As shown in FIGURE 2(a) of the drawings, the nose cone 35 is jettisoned from about space station 11, and a similar procedure is utilized in jettisoning shroud 45 from around space station 37, the difference being that shroud 45 is forcibly ejected from around space station 37 in two parts moving in opposite directions. Further, once it becomes apparent that launch vehicle 36 is successfully establishing space station 37 in orbit, the emergency escape system associated with the space vehicle 33 attached thereto is also jettisoned as no longer required. Thereafter, space station 37, which is provided with means equivalent to the means provided for inflating and erecting the foldable portions of space station 11, is also erected in orbit in substantially the same manner as space station 11, hereinbefore described. The crew members of space station 37 may then enter thereinto from space vehicle 33 through the alined hatch means interconnecting the interiors thereof.

Figure 5:
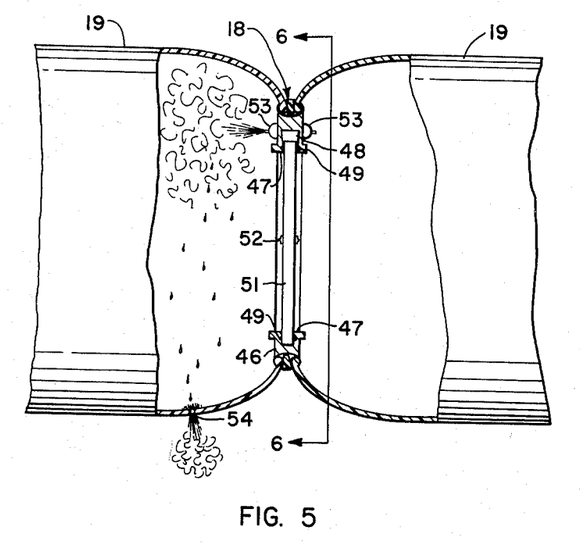
FIGURE 5 is a side elevational view, partially in section, of a bulkhead including a removable closure door element provided for sectionalizing the space station inflatable crew quarters.
Figure 6A:
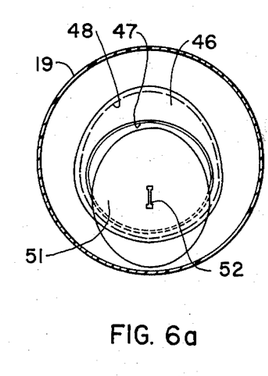
FIGURES 6(a)–6(c) are views taken in the direction of the arrows of the line 6—6 of FIGURE 5 showing the sequence of events in inserting, positioning, and disposing the closure door element in the bulkhead between crew quarter sections.
Figure 6B:
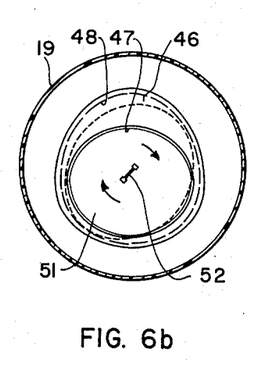
Figure 6C:
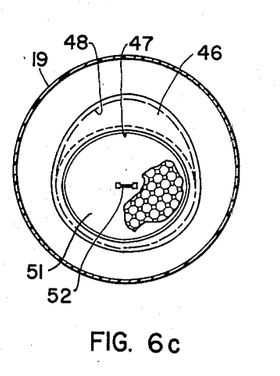

Bulkhead means, generally designated by the reference numeral 18, have hereinbefore been mentioned as being provided for segmenting the crew quarters 17 of space station 11 into a number of crew compartments 19. These bulkhead means 18 are also similarly utilizable to divided the crew quarters 17 of space station 37 into a number of similar crew compartments 19. Bulkhead 18 includes a rigid frame member 46 which, when viewed from the interior of a crew compartment 19, as in FIGURES 6(a)–6(c), is seen to be ovoidal in form, having a vertical axis somewhat longer than its horizontal axis. The periphery of frame 46 includes any desired type of structural connection for the wall ends of both adjoining crew compartments 19, which may take the form shown sectionally in FIGURE 5 and which, as considered conventional, will not be further discussed herein. Formed through frame member 46 is an oval shaped opening 47 disposed in the lower part thereof, as best seen in FIGURES 6(a)–6(c) which are views of the bulkhead construction taken along line 6—6 of FIGURE 5; the opening 47 being sufficient in size to permit passage of a space station occupant from one compartment 19 to the next adjoining compartment 19, and having a long axis horizontally disposed at right angles to the long axis of frame 46 but which is of a length less than the long axis of frame 46. Frame 46 is provided with a centrally disposed recess 48 lying midway between the two planar faces thereof, and which in extent is of ovoidal shape corresponding to the perimetrical shape of frame 46 and only slightly smaller in area, as indicated in phantom outline in FIGURES 6(a)–6(c). On the opposed inner spaced faces of recess 48 are grooves 49 surrounding opening 47 and which are adapted to retain a nonmetallic sealing strip, such as Neoprene, or the like, protruding slightly therefrom.

A door member 51, centrally provided on each opposed surface thereof with a U-shaped handle 52, is adapted to be inserted into recess 48 of frame 46 to close opening 47. Door 51, as best shown in FIGURES 6(a)–6(c), is oval in shape, corresponding to the oval shape of opening 47, but is larger in area than opening 47. Preferably, as indicated in FIGURE 6(c), door 51 is of lightweight construction, formed of a pair of thin surface sheets with a honeycomb core extending therebetween. Door 51 is inserted into the recess 48 with the long axis thereof vertically disposed and the upper extremity thereof entering the recess adjacent the upper extremity of opening 47, as illustrated in FIGURE 6(a). Door 51 is then moved vertically upwardly into recess 48 until the lower edge thereof clears the lower extremity of opening 47, and then the door 51 is rotated sideways within recess 48, as shown in FIGURE 6(b), until its long axis is horizontally positioned and the door 51 is seated in the lower part of recess 48, as shown in FIGURE 6(c), in which position door 51 completely closes opening 47 in frame 46. It is now considered apparent that, in the event of the development of an interior air pressure differential between adjoining compartments 19, the door 51 will move toward the compartment 19 having the lower internal air pressure and press against the seal strip in the indicated groove 49, regardless of in which direction the interior air pressure differential develops. It will thus be seen that the particular bulkhead closure means set forth is particularly adapted to seal off a leaking crew compartment 19 from the remainder of the toroidal crew quarters 17 of either of the alternative embodiments of the space station of the present invention.

In practice, each of the crew compartments 19 is preferably kept closed from the adjoining compartments 19; the doors 51 being removed from frames 46 only when a crew member desires to pass from one compartment 19 to another. Space stations 11 and 37 are each preferably provided with a suitable conventional alarm system, not shown, capable of warning the occupants thereof when air pressure begins to drop below a predetermined level in any compartment 19, which may readily occur in the event of a puncture of the skin of a compartment 19 as, for example, by micrometeorite penetration. Any crew members present in a leaking compartment 19 then leave the compartment, setting doors 51 in place in frames 46 at each end of the compartment thereafter. As air leaks from the ruptured compartment 19 through a puncture, as indicated at 54, air currents are set up in the compartment leading toward the puncture aperture. Accordingly, a suitable spray device 53, as indicated schematically in FIGURE 5, is provided in each compartment 19, which may be selectively activated to spray into a leaking compartment 19 droplets of a suitable liquid which will harden in a vacuum, or of a liquid which will react with the material of the outer plies of the wall of compartment 19, to seal the puncture. Numerous solutions of plastics having these inherent physical and chemical property characteristics will be obvious to those skilled in the art and any of which are considered within the scope of the present invention. One example of an oxygen stabilized solution of plastic would be an ortho-chloro-phenol solution of Mylar which, as is well known, readily solidifies when subjected to vacuum or the environmental conditions present in operation of space stations 11 and 37. These droplets would be drawn by the air currents set up in the compartment toward the puncture, as illustrated in FIGURE 5, and automatically effectuate sealing of the puncture as shown at 54 in FIGURE 5. The space station, preferably, would then also be provided with suitable conventional dehumidifier means to remove the excess vapor released by spray devices 53 from the air, so that it may be reused by the occupants of the space station.

While the space stations 11 and 37 set forth herein have been described as being particularly suited for planetary orbital operation, it will also be apparent that these space stations could also be utilized as manned deep space ships despatchable to the moon or to other planets in the local solar system, as well as being usable as ground bases when landed on the surfaces of such bodies. Obviously, also, many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A space station capable of being foldably disposed as the payload of a launch vehicle and thereby launched from a planetary surface into an extraplanetary spatial vacuum and habitable by living occupants, comprising: a habitable center section, a habitable flexible inflatable toroidal section operationally concentrically disposed around said habitable center section, flexible tubular passageway sections interconnected between said habitable center section and said habitable toroidal section at radially spaced intervals operationally adapted to provide access between said center section and said toroidal section for occupants of said space station, means for collecting the radiant energy of sunlight and converting said radiant energy into energy usable in the operation of said space station, said radiant energy collecting means being concentrically positioned with respect to an axis centrally passing through said center section and about which said toroidal section is concentrically disposed.

2. The space station according to claim 1 including means for establishing rotation of said space station about said axis at a predetermined rate.

3. The space station according to claim 2 including means for segmenting said toroidal section into a plurality of independently habitable compartments.

4. The space station according to claim 3 wherein said means for segmenting said toroidal section comprises a bulkhead having a space station occupant traversable opening therethrough, and a closure member for sealing said opening against the passage of air therethrough upon the establishment of an internal air pressure differential between said compartments adjoining said bulkhead.

5. The space station according to claim 3 wherein each of said habitable compartments is provided with a flexible substantially flat surface treadable by said space station occupants.

6. The space station according to claim 3 wherein at least one of said habitable compartments is provided with integral flexible contour maintaining furnishings usable by said space station occupants.

7. The space station according to claim 6 wherein each of said habitable compartments is provided with means actuatable to effectuate stoppage of punctures in the wall thereof causing air leakage therefrom.

8. A space station capable of being foldably disposed as the payload of a launch vehicle and thereby launched from a planetary surface into an extraplanetary spatial vacuum for operation therein comprising; a habitable center section, means interconnected with said habitable center section for collecting the radiant energy of sunlight and converting said solar radiant energy into energy usable in the operation of said space station including a surface defining structure extensible from a folded launch configuration in which said structure is substantially linearly concentrically positioned around an axis passing centrally through said center section to an erected operating configuration in which a large area of said structure is exposed to sunlight, a habitable flexible inflatable toroidal section extensible from a deflated folded launch configuration in which said toroidal section is foldably disposed around said center section to an inflated erected operating configuration in which said toroidal section is disposed concentrically around said axis passing through said center section in equidistant spaced relation from said habitable center section, and means interconnected between said habitable center section and said habitable toroidal section at operationally radially spaced intervals for maintaining the operational configuration of said space station.

9. The space station according to claim 8 wherein said large area exposed to sunlight of said surface defining structure when operatively erected is of substantially paraboloidal form capable of reflecting sunlight, and said solar energy collecting and converting means includes a powerplant having a boiler element operatively positioned at the focus of said paraboloidal surface.

10. The space station according to claim 8 wherein said surface defining structure comprises a plurality of rigid fan-shaped elements hingedly connected along a base edge thereof to said habitable center section.

11. The space station according to claim 8 including means for establishing rotation of said space station about said axis at a predetermined rate.

12. The space station according to claim 11 including means for segmenting said inflatable toroidal section into a plurality of independently habitable compartments.

13. The space station according to claim 12 wherein said means for segmenting said toroidal section comprises a bulkhead having a space station occupant traversable opening therethrough, and a closure member for sealing said opening against the passage of air therethrough upon the establishment of an internal air pressure differential between said compartments adjoining said bulkhead.

14. The space station according to claim 12 wherein each of said habitable compartments is provided with a flexible substantially operationally flat surface treadable by said space station occupants.

15. The space station according to claim 12 wherein at least one of said habitable compartments is provided with integral flexible operationally contour maintaining furnishings usable by said space station occupants.

16. The space station according to claim 15 wherein each of said habitable compartments is provided with means actuable to effectuate stoppage of punctures in the wall thereof causing air leakage therefrom.

17. The space station according to claim 16 wherein said means interconnected between said habitable center section and said habitable toroidal section at operationally radially spaced intervals comprise flexible tubular passageways operationally adapted to provide access between said center section and said toroidal section for said occupants of said space station.

18. For use in a foldable, flexible, inflatable living area section of a space station operable in an extraplanetary vacuum and habitable by living occupants, bulkhead means for segmenting said inflatable living area section into a plurality of independently habitable compartments, comprising an ovoid shaped frame member interposed between two compartments each of which is connected thereto in sealed relation, and having an oval shaped opening formed therethrough traversable by occupants of said space station living area section, said oval opening having a long axis disposed at right angles to the long axis of said ovoidal frame member and being disposed adjacent the broader end of said frame member, a central recess formed in said frame member between opposed planar outer surfaces thereof, seal means disposed in the opposed inner faces of said central frame member recess surrounding the oval opening formed therethrough, and an oval shaped closure member insertable into said frame member central recess and positionable therein to block the oval opening formed through said frame member with opposed planar faces of said closure member positioned between said seal means, whereby the development of interior air pressure differential between said two compartments induces movement of said closure member into contact with seal means surrounding said oval opening to block transfer of air between said two compartments.

References Cited in the file of this patent

UNITED STATES PATENTS

| | | |
|---|---|---|
| 1,372,528 | Marcovsky | Mar. 22, 1921 |
| 2,057,687 | Manson | Oct. 20, 1936 |
| 2,991,027 | Geyling | July 4, 1961 |

OTHER REFERENCES

Project Satellite, by Kenneth W. Gatland, pub. 1958.
NASA Authorization for Fiscal Year 1961.